United States Patent [19]
Wellman, Jr. et al.

[11] 3,931,620
[45] Jan. 6, 1976

[54] TEMPERATURE-RESPONSIVE ALARM CONTROL CIRCUIT

[75] Inventors: Carl E. Wellman, Jr.; Ronald J. Doerr, both of Louisville, Ky.

[73] Assignee: General Electric Company, Louisville, Ky.

[22] Filed: June 26, 1974

[21] Appl. No.: 483,141

[52] U.S. Cl. ............ 340/228 R; 340/233; 323/75 E; 307/252 F; 99/421 TP; 99/342; 73/352; 317/DIG. 6
[51] Int. Cl.² ................... G08B 21/00; F24C 15/00
[58] Field of Search ............... 340/228, 227 R, 233; 73/352; 99/421 TP, 342; 307/252 F; 323/75 E; 338/28; 317/DIG. 6

[56] References Cited
UNITED STATES PATENTS

| | | | |
|---|---|---|---|
| 3,594,752 | 7/1971 | Alton | 340/228 |
| 3,778,798 | 12/1973 | Heit | 340/228 |
| 3,815,113 | 6/1974 | Welch | 340/228 R |

*Primary Examiner*—John W. Caldwell
*Assistant Examiner*—William M. Wannisky

[57] ABSTRACT

Solid-state circuitry is provided for an electrical thermometer for monitoring the interior temperature of food being cooked. A temperature sensing thermistor located in the tip of a probe, adapted to be partially inserted in food being cooked so as to monitor the interior temperature, is combined in circuit with a programmable unijunction transistor (PUT), used as a bridge threshold detector, an NPN transistor-diode load current switch and a buzzer alarm coil such that upon the reaching of a preset temperature within the food, the buzzer alarm is actuated. The self-heat of the thermistor probe provides a latching effect ensuring the continued firing of the PUT with the resultant smooth operation of the buzzer alarm. A resistor is combined in circuit to allow a slight back current to flow through the buzzer coil, thereby allowing the use of a buzzer alarm with a fairly non-critical air gap.

5 Claims, 3 Drawing Figures

TEMPERATURE-RESPONSIVE ALARM CONTROL CIRCUIT

BACKGROUND OF THE INVENTION

1. Field of the Invention

The present invention relates to a condition responsive circuit, and particularly to circuitry comprising an electrical thermometer for monitoring the interior temperature of food being cooked.

2. Description of the Prior Art

This invention was conceived as an improvement over the food-temperature monitoring apparatus disclosed in U.S. Pat. No. 3,778,798-Heit which is an improvement of the apparatus disclosed in the application of Stanley B. Welch, Ser. No. 124,325 filed Mar. 15, 1971, now U.S. Pat. No. 3,815,113, both assigned to the General Electric Company, the assignee of the present invention. These food-temperature monitoring devices were developed for use in monitoring the temperature of meat and other foods while being cooked in a baking or roasting oven. These devices provide a needle-like meat probe enclosing a small sensing thermistor, adapted to be driven into the food, in circuit with a programmable unijunction transistor employed as a detector of a Wheatstone bridge having a low voltage AC supply, and a signal alarm buzzer to be actuated upon the reaching of a desired temperature within the meat.

The present invention improves upon the previous inventions by locating the buzzer alarm within the circuit in series with a combination NPN transistor-diode, current switching device such that the current to operate the buzzer does not flow through the PUT or the voltage dividing resistors of the Wheatstone bridge. A resistor in series with the transistor base-collector junction and the buzzer alarm allows a slight back current to flow through the buzzer resulting in a greatly increased amount of magnetomotive force variation therein, allowing a much less critical buzzer air gap. The NPN transistor is turned on by the PUT to allow load current for the buzzer to flow through the collector-emitter circuit during the positive excursion of the AC cycle.

It is therefore a general object of the present invention to provide a circuit, including a programmable unijunction transistor, that is responsive to a condition change such that the change is sensed and translated as a variance in electrical resistance in the circuitry whereby indication means is triggered to signal the condition change.

It is a more particular object of the present invention to provide a low-cost, solid-state electric thermometer with a circuit ensuring the smooth reliable operation of a buzzer alarm upon the reaching of a predetermined, preset temperature within food being cooked, wherein current to the buzzer alarm is limited only by the impedance of its coil and wherein the circuit allows a small back current to flow through the buzzer coil such that the buzzer may be characterized by a fairly noncritical air gap.

SUMMARY OF THE INVENTION

In accordance with the present invention, a condition responsive circuit of the type having impedance means for supplying an indication of external conditions to be sensed includes a pair of input supply terminals adapted to be coupled to an electrical energy source for supplying alternating current. A four-leg impedance bridge network having first and second common terminals is coupled across these input supply terminals, and two comparison terminals are located intermediate respectively the first and second legs and the third and fourth legs of the bridge network. A threshold device is included in circuit coupled to the comparison terminals of the bridge network to function as a threshold detector. The conductor sensing impedance means is coupled in circuit with one of the legs of the bridge network. An indication means is coupled serially with load switching means across the supply terminals, the load switching means being responsive to the switched-on state of the PUT to become operative for effecting operation of the indication means. Means are provided for establishing a switching level for the load switching means and for limiting current to the indication means during the negative excursion of the AC cycle.

DESCRIPTION OF THE PREFERRED EMBODIMENT

Figure 1:
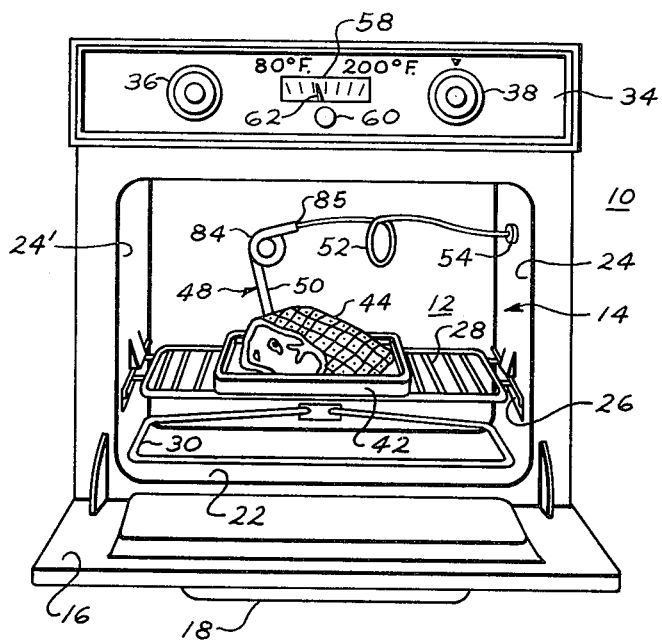
FIG. 1 is a front elevational view of an electric, built-in, wall oven shown with the oven door open and an electric thermometer system is illustrated therewith.

Referring to FIG. 1 of the accompanying drawing, there is shown for illustrative purposes an electric, built-in wall oven 10 in which the present invention may be incorporated, although it will be obvious to those skilled in the art that this invention is in no way limited to such a setting or application. Oven 10 is of standard construction having an oven cooking cavity 12 framed by box-like oven liner 14 and a front-opening access door 16 having a handle 18. The door 16 is shown in this view in its horizontal, fully-open position.

The oven liner 14 has a bottom wall 22 and opposite side walls 24, 24' which are framed with rack supports or ledges 26. A slidable food supporting rack 28 is suspended between the rack supports 26. A lower baking element 30 is positioned adjacent the bottom wall 22 of the oven liner.

A control panel 34 is shown positioned above the oven in a frontal position to occupy substantially the same vertical plane as the oven door 16 when this door is in its vertical, closed position. The electrical controls of the oven are mounted in this control panel. There is shown, for example, oven selector switch 36 and oven thermostatic control 38 for governing the temperature within the oven cooking cavity 12. An oven timer (not shown) is also commonly furnished with the oven.

Oven rack 28 supports a shallow pan 42, shown containing a half of ham 44 which, for example, is to be baked to an internal temperature of about 150°F. While the oven ambient temperature is set by oven thermostat 38 to, say 350° F. Obviously, more massive cuts of meat must be heated for a greater length of time than smaller cuts; this variable cooking time serves to inconvenience the cook by requiring close supervision of the cooking process. An electric thermometer, such as that provided by the present invention, serves to ameliorate this situation. Shown within the oven 10 is an electric thermometer system 48 comprising, in part needle-like probe 50 with its tip inserted into the central portion of the meat 44. A flexible cable 52 is attached to the other end of the probe, this cable is of such length that it may be connected to a wall-mounted receptacle 54 in one of the side walls of oven liner 14. The receptacle 54 is provided with connecting cables (not shown) which extend upwardly to the oven control panel 34 where they join with terminals of the circuitry of the present invention. Temperature setting gauge 58 is included and is shown with a temperature scale extending from 80° to 200° F. There is provided a manually adjustable knob 60 and a pointer 62 that moves when the knob is turned, for setting a predetermined internal temperature to be reached within the meat 44.

Figure 2:
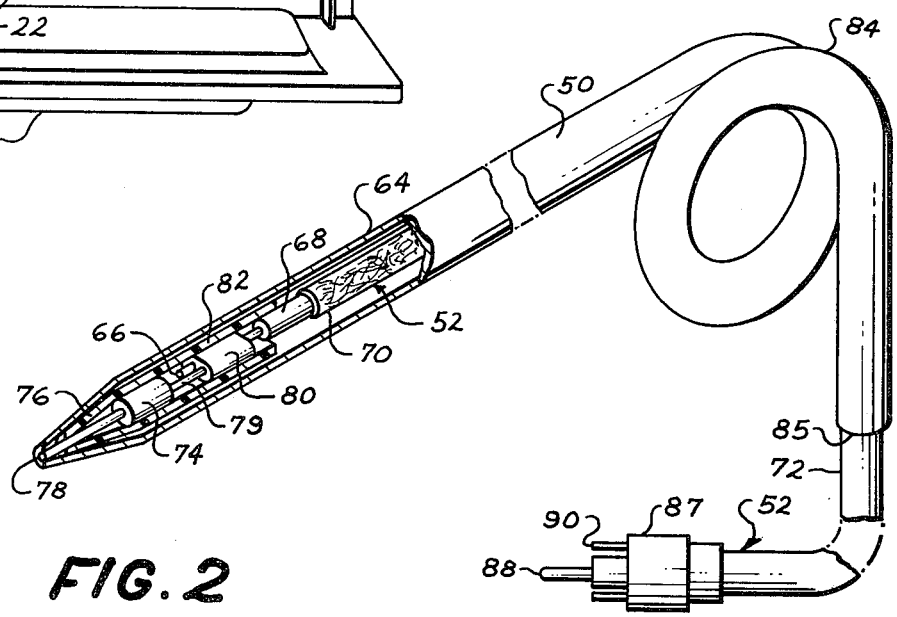
FIG. 2 is a perspective view of the temperature sensing probe first shown in FIG. 1 and here shown on an enlarged scale and having a part of its metal sheath removed to illustrate the internal construction.

The temperature sensing probe 50 is shown in FIG. 2 as comprising a thin wall stainless steel tubing 64 of about 3/32 inch outside diameter having the overall appearance of a knitting needle. Within the probe 50 is assembled flexible coaxial cable 52 comprising a center conductor 66, a layer of insulation 68, and a woven outer conductor 70 surrounding the insulating layer 68. Cable 52 is covered with another sheath 72 of high temperature insulation such as polytetrafluoroethylene, commonly sold under the trademark Teflon. This coaxial cable 52 is extra-flexible and has the characteristcs of a small diameter lead wire. Most of this insulating sheath has been stripped from that portion of the cable length extending within tubular probe 64.

Impedance means for supplying an indication of external conditions to be sensed, such as condition sensing impedance means, a temperature sensitive thermistor 74, is positioned within the free end 76 of probe 50. This free end is pointed so as to facilitate the insertion of the probe into the meat. Thermistor 74 has two terminals, 78 and 79, each extending longitudinally from opposing ends thereof. The outermost terminal 78 is electrically and mechanically attached to the pointed tip 76 of the probe, while the innermost terminal 79 is electrically connected to the center conductor 66 of the coaxial cable 52 by means of a crimped sleeve 80. Outer conductor 70 has been stripped back from the exposed center conductor 66 and an insulating sleeve 82 is assembled over the exposed portion of the cable to insulate center conductor 66 from the tubular probe. The innermost end of tubular probe 64 is wound into a closed loop as at 84, serving to collapse the tube tightly into contact with the outer conductor 70 and further, to seal the tube at end 85 over the Teflon insulation 72. This loop also serves as a hand-hold for grasping the probe. The free end of the cable 52 is provided with an electrical plug 87 having a central conductor 88 insulated electrically from an overlying cylindrical split collar 90 for holding the plug in the wall-mounted receptacle 54 as shown in FIG. 1.

Figure 3:
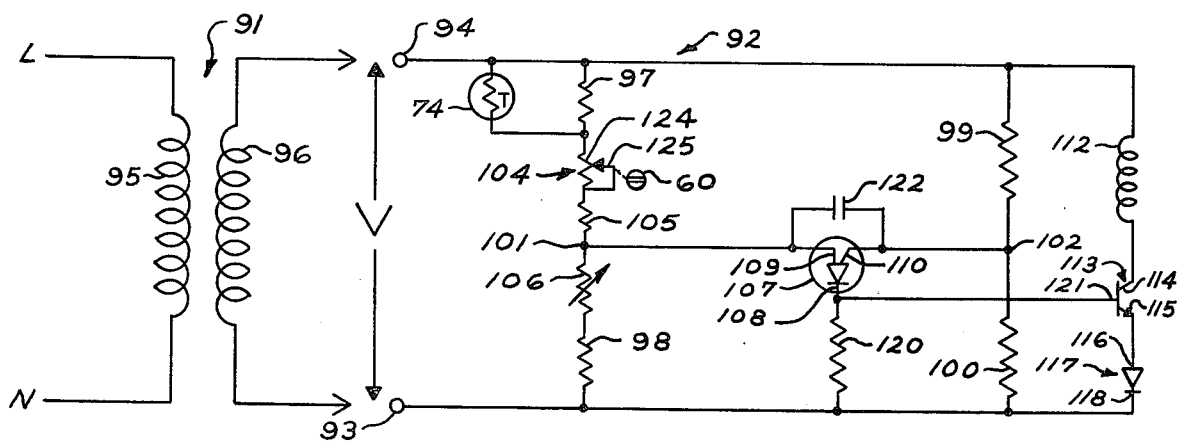
FIG. 3 is a schematic representation of the preferred embodiment of the temperature-responsive alarm control circuit of the present invention.

In accordance with the present invention, condition responsive circuitry, such as temperature responsive alarm control circuit 92, schematically illustrated in FIG. 3 of the drawing, includes input supply terminals 93 and 94 adapted for coupling to a low-voltage AC power source, such as a suitable step-down transformer 91 having a primary winding 95 and a secondary winding 96. The primary 95 may be connected to a standard electrical power source of 115 volt, 60 Hz. current, available in the home, by proper connection of lines L and neutral N. Step-down transformer 91 may be a separate transformer for this electric thermometer system 48 or, power may be tapped from the existing transformer used for the oven control 38.

There is a four-leg impedance bridge network having first and second common terminals coupled across the input supply terminals 93 and 94, respectively, such as a Wheatstone bridge comprising a first leg including fixed resistor 97, a second leg including fixed resistor 98, a third leg including fixed resistor 99 and a fourth leg including fixed resistor 100. The first and second legs and the third and fourth legs form, respectively, voltage divider networks having comparison terminals 101 and 102. Temperature sensing thermistor 74 of probe 50 is electrically coupled in circuit, preferably removably, with the first leg so as to be in parallel with fixed resistor 97. A variable resistor such as rheostat 104 is electrically connected in circuit with the first leg so as to be in series with a fixed resistor 105 and the parallel combination of thermistor 74 and fixed resistor 97. Variable resistor 106, a calibrating device, is serially connected with fixed resistor 98 in the second leg.

A threshold device, such as programmable unijunction transistor (PUT) 107 functions as a threshold detector for the bridge and has its cathode 108 connected to the first common network terminal and input terminal 93, an anode 109 connected to comparison terminal 101 intermediate the first and second legs of the bridge and a gate 110 connected to comparison terminal 102 intermediate the third and fourth legs of the bridge.

A PUT is a PNPN device with characteristics such that, when the diode (anode to gate) becomes forward biased, (i.e., when the anode is slightly more positive than the gate) it conducts, and the regeneration inherent in such a device causes it to switch on; a negative resistance characteristics is generated from anode to cathode. Thus, the PUT 107 functions as a detector for the bridge circuit, as described above.

Indication means, which may take the form of an audible signal means such as a buzzer alarm device having a coil 112, is connected serially with load switching means across input supply terminals 93 and 94. The load switching means may take the form of transistor-diode combination, such as NPN transistor having a collector 114 coupled with coil 112 and an emitter 115 coupled with the anode 116 of a diode 117, the cathode 118 of the diode is then coupled to terminal 93.

Means for establishing a switching level for the load switching means, that is, for NPN transistor 113, and for limiting current to the coil 112 during the negative excursion of the AC cycle takes the form of a resistor 120 coupled serially between the junction of PUT cathode 108 and NPN transistor base 121 and input supply terminal 93. Resistor 120 also serves to reduce dissipation in the PUT thereby to extend its life. Also included in the circuit is an RF suppressing capacitor 122 coupled across the PUT anode 109 and gate 110.

Thermistor 74, used here in the first leg of the bridge, has a negative temperature coefficient. As the temperature of the thermistor rises, its resistance drops; during the positive half cycle of the AC supply voltage, that voltage at terminal 101, the PUT anode voltage, becomes more positive. When the anode voltage becomes slightly more positive than the PUT gate voltage, the PUT will switch on with a voltage drop from anode to cathode of approximately 1 volt. This switching signal from the PUT will cause NPN transistor 113 to be turned on to allow current to flow through coil 112, through the collector-emitter of the transistor 113, then through diode 117. Coil 112 then is essentially across the power supply input terminals 93 and 94 and current therethrough is limited only by the coil's impedance. Such an application allows for the use of buzzer alarm devices having fairly non-critical air gaps, therefore cheaper and simpler devices. This also allows for the use of a higher powered buzzer device and therefore, a louder alarm is sounded. Diode 117 prevents the actuation of buzzer coil 112 during the negative excursion of the AC cycle and as well as during the positive excursion when transistor 113 is not gated into conduction.

There are certain advantages in a circuit arrangement of this type. First, since they need not carry buzzer current, all the resistors of the bridge network may be of the high-impedance, low wattage type. Secondly, with the thermistor 74 located in the first leg of the bridge, the self-heat of the probe provides a latching effect in the circuit. The first time that the PUT fires, the effective voltage across the probe increases, further heating the probe and thermistor 74 thereby decreasing its resistance and the resistance of the first leg, ensuring the continued firing of the PUT and the smooth operation of the alarm buzzer. Third, during the negative half-cycle of the AC supply voltage, a slight back current, limited by the impedance of resistor 120, can flow through the base-collector diode of transistor 113 and the coil 112 resulting in a greatly increased amount of magnetomotive force variation, allowing in turn, the use of a buzzer with a fairly non-critical air gap.

Turning now to the operation of the circuit 92 as a food temperature monitoring device, control knob 60 (as shown in FIGS. 1 and 3) on control panel 34 is associated with the variable resistor 104, a setting rheostat, for presetting the desired temperature to be reached within the meat 44 when fully cooked. Variable resistor 104 includes a resistor element 124 and an arm 125, which is movable across the resistor element 124 upon the rotation of control knob 60. Combined with the control knob 60 is the temperature gauge 58 and the pointer 62 which moves only when knob 60 is turned.

The value of resistor element 124 is set such that, during the positive half-cycle of the AC voltage, the anode-cathode voltage of the PUT 107 is slightly more positive than the gate-cathode voltage thereof so as to cause the PUT to fire when a temperature sensitive variable resistor, such as thermistory 74, reaches a value which corresponds to the temperature set by the pointer 62 on gauge 58, and hence, the movable arm 125 of control knob 60.

A thermistor shunt resistor 97 is included to linearize the thermistor characteristics so as to yield a reasonably linear temperature scale 58.

The critical point of the circuit is reached when the instantaneous applied voltage is a maximum; this occurs at the peak of the positive half-cycle. At this point, the equivalent impedance of resistors 104, 105, 97 and 74 is always some constant value and the circuit is calibrated to be critical at this value by means of the variable resistor 106 in the second leg of the bridge network.

As stated above, the setting of control knob 60 at a given temperature on scale 58 provides the setting rheostat 104 with a resistance value such that the firing of the PUT 107 will coincide with the reaching of that preset temperature within the meat, which temperature is being sensed by the thermistor 74 in the tip of meat probe 50. Upon reaching that preset temperature, PUT 107 will switch on to turn on transistor 113 and current will flow during the positive excursion of the AC cycle to actuate buzzer coil 112 and thereby give an audible signal that the predetermined temperature has been reached.

This electric thermometer system is a "slide back" system which sounds the buzzer alarm when the internal meat temperature reaches the preset temperature, but does not indicate the existing temperature directly. Should the operator desire to know the internal meat temperature during the cooking cycle, he may determine this by moving pointer 62 down the temperature scale until the buzzer alarm sounds, then reading the indicated temperature on gauge 58.

The circuit components of the present invention are easily adapted to be mounted upon a printed circuit board (not shown). Sufficient space may also be provided for mounting the temperature indicating scale 58 thereon, and a simplified interconnector between cable 52 of probe 50, and likewise of thermistor 74, and the printed circuit board may also be provided.

While it has been shown that a voltage divider comprising resistors 99 and 100 may serve to provide a voltage for gate 110 of PUT 107, it will be obvious to those skilled in the art that gate 110 may be connected directly to a point on the secondary winding 96 of transformer 91.

Components found to be satisfactory in the illustrated embodiment of the present invention are:

| | |
|---|---|
| Thermistor 74 | National Lead type 2H103; 10K ohms at 77° F |
| Resistor 97 | 2.7 K ohms |
| Resistor 98 | 5.5 K ohms |
| Resistor 99 | 1.1 K ohms |
| Resistor 100 | 2.2 K ohms |
| Rheostat 104 | 0–1350 ohms |
| Resistor 105 | 1 K ohms |
| Variable Resistor 106 | 0–3 K ohms |
| PUT 107 | 2N6027 |
| Coil 112 | 55 ohms |
| NPN transistor 113 | 2N3402 |
| Diode 117 | 1N5059 |
| Resistor 120 | 1 K ohms |
| Capacitor 122 | .01 $\mu$F |

It should be noted that, while a programmable unijunction transistor is used as the threshold detector in the preferred embodiment, other suitable devices may be used in lieu thereof. For example, a diode might be used having its anode coupled to comparison terminal 101 and its cathode coupled to comparison terminal 102 and likewise a zener diode or a diac might be used. Also the combination NPN transistor-diode serving as a load switching means for the buzzer coil 112 may be replaced with an SCR also responsive to the PUT to become gated into conduction.

While that which has been heretofore described refers to a solid-state circuit device for monitoring the temperature of food being cooked, it will be obvious that such a device has further novel applications. It may, for example, be used as a fire-detection system, or, thermistor 74 may be replaced by a photo-sensitive resistor thereby allowing the device to be used to activate lighting systems, and when thus used in conjunction with a small light source, it may be used as a smoke detection system or a burglar detector. Thermistor 74 may also be replaced by a pressure-sensitive resistor allowing the device also to be used as a burglar detector.

It should be apparent to those skilled in the art that the embodiment described heretofore is considered to be the presently preferred form of this invention. In accordance with the patent statutes, changes may be made in the disclosed apparatus and the manner in which it is used without actually departing from the true spirit and scope of this invention.

What is claimed is:

1. A condition responsive circuit of the type having impedance means for supplying an indication of predetermined external conditions to be sensed, the circuit comprising:
   a pair of input supply terminals adapted to be coupled to an electrical energy source for supplying alternating current;
   a four-leg impedance bridge network having first and second common terminals coupled across the input supply terminals and two comparison terminals intermediate respectively the first and second legs of the bridge network and the third and fourth legs;
   a threshold device coupled to the comparison terminals of the bridge network to function as a threshold detector;
   the condition sensing impedance means being coupled in circuit with one of the legs of the bridge network;
   a buzzer alarm device having a coil coupled serially with load switching means across the input supply terminals, the load switching means being responsive to a switched-on state of the threshold device to become operative for effecting operation of the buzzer alarm device when a predetermined external condition is sensed; and
   means for establishing a reference level for the load switching means and for limiting current to the buzzer alarm device during the negative excursion of the AC cycle.

2. The circuit of claim 1 wherein:
   the threshold device is a programmable unijunction transistor having a cathode coupled to the first common bridge network terminal, an anode coupled to the comparison terminal intermediate the first and second legs, and a gate coupled to the comparison terminal intermediate the third and fourth legs.

3. The circuit of claim 1 wherein the condition sensing impedance means is a thermistor removably coupled in circuit with the first leg of the bridge network.

4. The circuit of claim 1 wherein the load switching means is an NPN transistor-diode combination, the transistor having an emitter coupled with the anode of the diode, a collector coupled to the buzzer coil and a base coupled to the threshold device and the means for establishing a reference level and for limiting current is a resistor coupled between the transistor base and the first common terminal of the bridge network.

5. A temperature-responsive alarm control circuit of the type having probe means, including a temperature-sensitive thermistor, to be inserted into food being cooked for monitoring the interior temperature thereof, the circuit comprising:
   a pair of input supply terminals adapted to be coupled to an electrical energy source for supplying alternating current;
   a four-leg, impedance bridge network having first and second common terminals coupled respectively to the input supply terminals and two comparison terminals intermediate respectively the first and second legs of the bridge network and the third and fourth legs;
   a programmable unijunction transistor having a cathode coupled to the first common bridge network terminal, an anode coupled to the comparison terminal intermedite the first and second legs, and a gate coupled to the comparison terminal intermediate the third and fourth legs such that the programmable unijunction transistor functions as a threshold detector in the bridge network;
   the temperature sensitive thermistor of the probe means being removably coupled in circuit with the first leg of the bridge network such that the self-heat of the thermistor provides a latching effect to insure the continued firing of the programmable unijunction transistor once started;
   a buzzer alarm having a coil coupled across the input terminals;
   an NPN transistor having a collector coupled with the alarm coil, and a diode having an anode coupled with the transistor emitter and a cathode coupled with one of the input terminals, the transistor having a base coupled with the cathode of the programmable unijunction transistor, the NPN transistor-diode combination serving as a load switching device, the NPN transistor being responsive to a switched-on state of the unijunction transistor to become operative for passing current for effecting operation of the buzzer alarm when a predetermined temperature in the food is sensed; and
   a resistor coupled serially between the junction of the unijunction transistor cathode and the NPN transistor base, and the input terminal for establishing a reference level for the transistor base, and, further, for supplying demagnetizing current through the forward biased base-collector junction of the NPN transistor to the buzzer alarm coil during the negative excursion of the AC cycle.

* * * * *